United States Patent Office 3,546,926
Patented Dec. 15, 1970

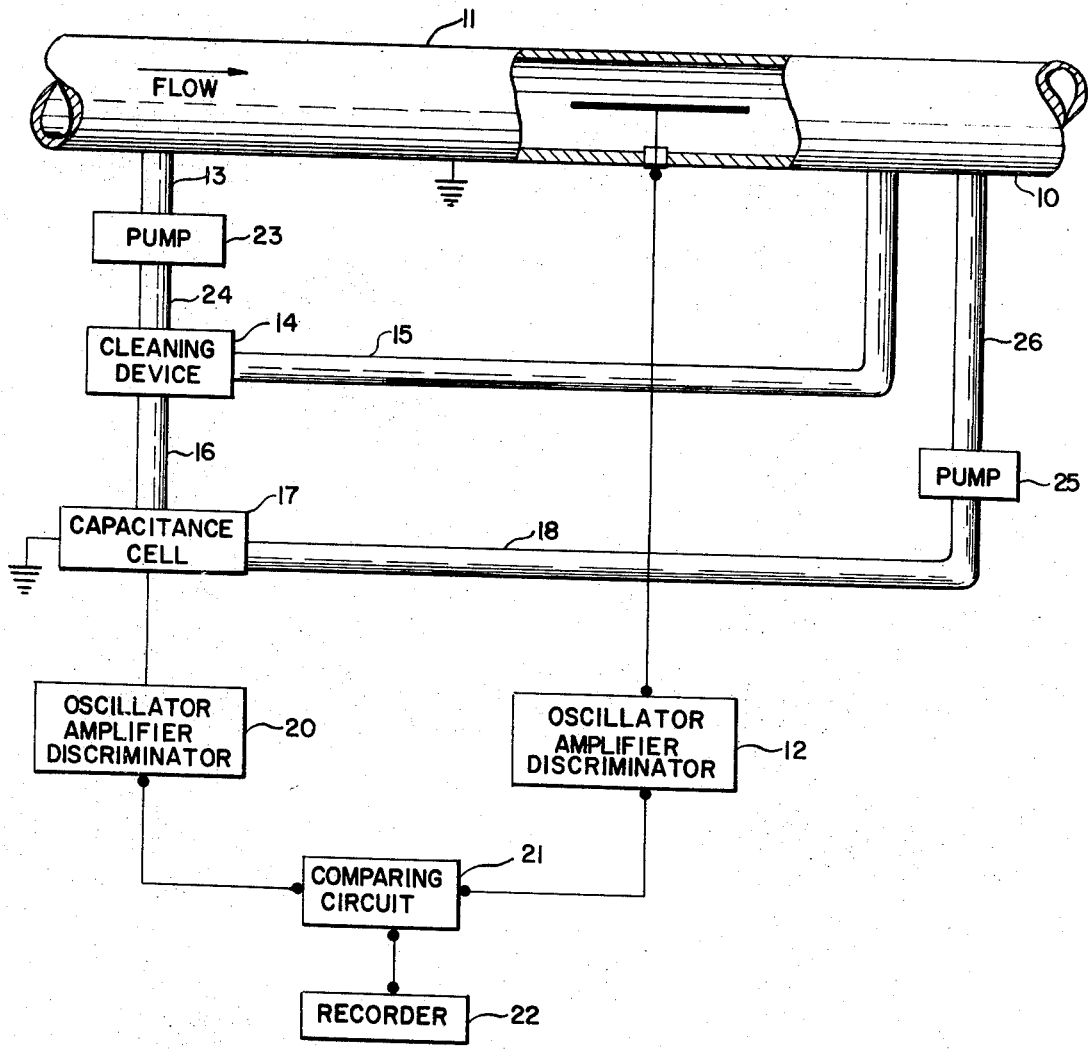

3,546,926
BOTTOM SEDIMENT AND WATER MONITOR
Sidney William Dunavent, Jr., and Paul R. Scott, Houston, Tex., assignors to Shell Oil Company, New York, N.Y., a corporation of Delaware
Filed Apr. 29, 1969, Ser. No. 820,271
Int. Cl. G01n 27/22, 33/22
U.S. Cl. 73—61.1                    1 Claim

ABSTRACT OF THE DISCLOSURE

A method for compensating the BS and W monitoring systems for changes in the dielectric constant of crude oil including the steps of removing a sample of the crude oil, cleaning the sample to remove all impurities and water, and measuring the dielectric constant of the cleaned sample. This value is then compared with the separately measured dielectric constant of the uncleaned crude oil and the difference between the two values is applied to the BS and W monitor as a compensation value to obtain the actual BS and W content of the crude oil.

BACKGROUND OF THE INVENTION

The present invention relates to oil field equipment and particularly equipment associated with the problem of transferring custody of petroleum products, for example, crude oil, after they have been produced and collected. As is well known, the quantity of crude transferred is converted to standard conditions prior to final settlement. In order to convert to standard conditions, it is necessary to know the temperature of the crude and the bottom sediment and water content of the crude, referred to as "BS and W." Various methods have been developed for measuring the BS and W content of crude, for example, samples of the crude can be taken and analyzed for BS and W content. Also, it is possible to use capacitor type measuring instruments to measure the BS and W content of the crude as it flows through the meter and eliminate the need to take samples. The latter approach is favored, since it permits automatic operation of custody transfer equipment without requiring the attention of outside personnel to obtain representative samples of the crude and conduct analysis of the crude. Also, the signal from the BS and W monitor can be used to compensate the flow meter or other measuring instruments to correct for the BS and W content.

While the BS and W monitors employing capacity measuring cells have been developed and are commercially available, they do have several drawbacks. The most serious problem arises when the type of crude oil is changed, since this requires a change in calibrating standard of the BS and W monitor. Since all capacity type monitoring equipment measures the dielectric strength of the material disposed between the plates of the measuring cell, any change in the dielectric constant of the crude requires a corresponding change in the monitor. At present the only method available for changing the calibration of a BS and W monitor is by manually adjusting the reference setting of the monitor. This, of course, can only be done by knowing in advance the dielectric constant of the crude, or in the alternative, by taking a sample of the crude and measuring the dielectric constant. Either operation is time consuming and can involve considerable interruption when the monitor is located at a remote gathering station and only visited at infrequent intervals.

SUMMARY OF THE INVENTION

The present invention solves the above problems by providing a BS and W monitor with an automatic means for compensating for changes in the dielectric constant of the crude oil stream. More particularly a sample of the crude stream is taken and passed through a cleaning device to provide a clean oil sample for a capacitance measuring cell. The cleaning device is preferably a centrifugal type filter which removes all the impurities, including water, from the crude and provides a clean, dry sample to the monitor equipment. The capacitance cell measures the dielectric constant of the clean crude sample and supplies an output signal that may be used to compensate or readjust the BS and W monitor. Thus, the BS and W monitor will provide an accurate measurement of the actual BS and W content of the crude flowing in the pipeline.

While the system is particularly adapted for use in BS and W monitors, obviously it can be used with other systems where capacitance cells are used to monitor the impurities in a flowing stream. In the case of other systems a filter should be used that will supply a clean sample of the stream to a separate capacitance cell monitoring system where capacitance cells are used to monitor the im-signal representing the actual dielectric constant of the fluid that can be used to compensate or readjust the contamination monitoring cell.

BRIEF DESCRIPTION OF THE DRAWING

The present invention will be more easily understood from the following detailed description of a preferred embodiment when taken in conjunction with the attached drawing showing in block diagram form one system suitable for performing the method of this invention.

PREFERRED EMBODIMENT

As explained above, the present invention while useful with any type of capacitance-measuring cell is particularly useful in combination with BS and W monitoring equipment such as that described in Pat. No. 3,006,189. The BS and W monitor described in the referenced patent uses a capacitance cell to measure the dielectric constant of crude oil flowing through a pipeline. The system uses the measurement signal to correct the flow measuring device so that it registers barrels of clean oil. The circuit shown in the patent utilizes a capacitance cell disposed in the pipeline and powered from an oscillator while the actual change in the dielectric constant of the crude is measured by a phase-comparing circuit. Any unbalance in the system is compensated by adjusting an external capacitor so that the external capacitance balances the capacitance of the crude flowing in the stream. The present invention utilizes a similar type capacitance cell and measuring circuit so that the output signal may be provided either in the form of a mechanical motion or shaft position or an electrical signal.

Referring now to the enclosed drawing there is shown a pipeline 10 having a capacitance cell 11 disposed therein. The pipeline 10 may be a crude oil pipeline or a pipeline conveying a fluid whose capacitance is being monitored. The capacitance cell 11 is powered by an oscillator amplifier discriminator circuit 12 similar to that shown in the above-referenced patent. The output of the oscillator-amplifier discriminating circuit is coupled to a comparing circuit 21 wherein it is compared with a signal representing the dielectric constant of a clean sample of the fluid flowing in the pipeline. A sample of the crude flowing in the pipeline is removed by the by-pass line 13 which is in communication with pump 23. Pump 23 increases the pressure sufficiently to cause the crude to flow through line 24, through cleaning device 14, through line 16, through capacitance cell 17, and through lines 15 and 18. Line 18 is in communication with pump 25 which controls the quantity of crude passing through capacitance 17 and increases the pressure sufficiently to cause the crude to flow through line 26 to line 10. As explained, the cleaning device 14 is preferably a centrifugal type of filter for example, the type described in Pat. No. 3,189,180 wherein the majority of the sample is returned to the pipeline through a line 15 downstream from the capacitance cell 11.

The cleaning device discharges its clean sample through a line 16 to a capacitance cell 17. The capacitance cell 17 is similar to the capacitance cell 11 and is designed to measure the dielectric constant of a fluid flowing past the plates of the cell. The clean sample, after passing through the capacitance cell 17 passes through line 18 to pump 25 which is in communication with line 10. The capacitance cell 17 is coupled to an oscillator amplifier discriminating circuit 20 identical with the circuit 12. The output signal of oscillator-amplifier discriminator 20 is supplied to the comparing circuit 21 wherein the signal representing the dielectric constant of a clean crude oil sample can be compared with the signal representing the dielectric constant of the gross crude oil sample. The comparing circuit 21 may take various forms, for example, it may be a system designed to correct total gross flow for the changes in the dielectric constant of the crude oil. In this case, the amplifier discriminator may be used to drive a servo-motor similar to that shown in the above-referenced Pat. No. 3,006,189, which could reposition an integrating circuit or other device for correcting the total gross oil flow. Also, the comparing circuit could be a simple circuit that provides an output signal equal to the difference between the two signals with the output signal being related to the actual BS and W content of the crude oil stream. In the latter case, the signal could be recorded on the recorder 22 and used at a later time to compensate the gross crude oil flow figures.

In the case where the above-described system is used with other types of fluid handling systems it may be desirable to merely record the changes in the dielectric constant of the fluid stream. Also, the measured changes in the dielectric constant could be used to compensate the monitoring system used for measuring the total impurities in the flow stream.

In addition to the above system other types of cleaning devices may be used, for example, centrifugal filters whereby the oil is caused to flow through a rotating porous filter member with the majority of the sample plus the impurities being discharged from the outside of the porous filter member. Also, other types of measuring systems may be used in place of those described in the above-referenced patent. For example, circuits that supply output signals representing the magnitude of the dielectric constant without the phase-nulling or rebalancing feature could be used.

We claim as our invention:

1. A method for compensating BS and W monitors comprising:
   removing a sample of the fluid being supplied to the monitors and pressurizing the sample;
   cleaning the pressurized sample to remove all impurities and water from the sample;
   measuring the dielectric constant of the clean sample and generating a signal related thereto;
   separately measuring the dielectric constant of the fluid and generating a signal related thereto; and
   separately comparing the signal related to the dielectric constant of the fluid with the signal related to the dielectric constant of the clean sample to obtain a compensated measurement of the actual BS and W content of the fluid.

References Cited

UNITED STATES PATENTS

| | | | |
|---|---|---|---|
| 2,599,583 | 6/1952 | Robinson et al. | 73—61.1UX |
| 2,915,701 | 12/1959 | Broeman | 73—53UX |
| 3,003,106 | 10/1961 | Vesper et al. | 73—61UX |
| 3,005,554 | 10/1961 | Kuntz | 73—61UX |
| 3,215,931 | 11/1965 | Schooley, Jr. | 324—61 |
| 3,253,606 | 5/1966 | Kuntz | 73—61.1X |

LOUIS R. PRINCE, Primary Examiner

J. W. ROSKOS, Assistant Examiner

U.S. Cl. X.R.

324—61